(12) United States Patent
Varhola

(10) Patent No.: US 9,939,135 B2
(45) Date of Patent: Apr. 10, 2018

(54) MAGNETIC HEADLIGHT ASSEMBLY

(71) Applicant: John Varhola, Bedford, OH (US)

(72) Inventor: John Varhola, Bedford, OH (US)

( * ) Notice: Subject to any disclaimer, the term of this patent is extended or adjusted under 35 U.S.C. 154(b) by 0 days.

(21) Appl. No.: 15/133,951

(22) Filed: Apr. 20, 2016

(65) Prior Publication Data
US 2016/0305636 A1 Oct. 20, 2016

Related U.S. Application Data

(60) Provisional application No. 62/149,724, filed on Apr. 20, 2015.

(51) Int. Cl.
| | | |
|---|---|---|
| *F21V 33/00* | (2006.01) | |
| *F21V 21/096* | (2006.01) | |
| *B60C 1/00* | (2006.01) | |
| *A01D 75/00* | (2006.01) | |
| *F21S 9/02* | (2006.01) | |

(52) U.S. Cl.
CPC ............ *F21V 21/0965* (2013.01); *B60C 1/00* (2013.01); *A01D 75/00* (2013.01); *F21S 9/02* (2013.01); *F21V 33/008* (2013.01)

(58) Field of Classification Search
CPC ....... F21Y 2115/10; B62B 9/005; B62B 9/00; F21S 48/215; F21S 6/003; B60Q 1/2615; B60Q 1/2696; B60Q 3/59; F21V 21/0965; F21V 23/04; F21V 15/01; F21V 21/08; F21V 21/0885; F21V 17/105; F21V 21/0816; F21V 21/26

USPC ......................................................... 362/184
See application file for complete search history.

(56) References Cited

U.S. PATENT DOCUMENTS

| 5,563,774 | A | | 10/1996 | Welsch | |
|---|---|---|---|---|---|
| 5,975,713 | A | * | 11/1999 | Brothers | ............ A47G 29/1209 362/154 |
| 6,394,633 | B1 | * | 5/2002 | Perez | ........................ B62B 9/00 280/38 |
| 6,406,164 | B1 | * | 6/2002 | Small | ........................ B60Q 7/00 362/191 |
| 6,511,214 | B1 | * | 1/2003 | Parsons | ................ A44B 15/005 362/116 |
| 6,821,006 | B2 | | 11/2004 | Shikiya | |
| 7,121,700 | B1 | * | 10/2006 | Scanlon | ............... B60Q 1/2611 362/183 |
| 7,131,756 | B2 | * | 11/2006 | Leslie | ...................... B60Q 3/59 362/253 |

(Continued)

*Primary Examiner* — Thien M Le
(74) *Attorney, Agent, or Firm* — Global Intellectual Property Agency, LLC; Jordan Sworen

(57) ABSTRACT

A magnetic headlight assembly. The magnetic headlight assembly includes a housing having a light assembly and one or more magnetic coupling mechanisms that can attach the headlight assembly to a working appliance, such as a lawnmower. The magnetic coupling mechanisms allow for the adjustment, attachment, and removal of the light assembly from a variety of working appliances without the need for tools. The light assembly includes one or more light sources that are controllable from a control box that can be selectively activated by a user for improved vision in low and no light conditions. In one embodiment, multiple magnetic headlight assemblies are electrically connected and independently controllable from each other.

14 Claims, 3 Drawing Sheets

(56) References Cited

U.S. PATENT DOCUMENTS

| | | | |
|---|---|---|---|
| 7,857,330 B2* | 12/2010 | Chaudeurge | B62B 9/005 |
| | | | 280/47.25 |
| 8,549,699 B1 | 10/2013 | Domingo | |
| 8,646,952 B2 | 2/2014 | Walden et al. | |
| 2014/0112010 A1 | 4/2014 | Lambert et al. | |
| 2016/0116145 A1* | 4/2016 | Moyers | A01D 34/001 |
| | | | 362/249.05 |

* cited by examiner

MAGNETIC HEADLIGHT ASSEMBLY

CROSS REFERENCE TO RELATED APPLICATION

This application claims the benefit of U.S. Provisional Application No. 62/149,724 filed on Apr. 20, 2015. The above identified patent application is herein incorporated by reference in its entirety to provide continuity of disclosure.

BACKGROUND OF THE INVENTION

The present invention relates to headlight assemblies. More specifically, the present invention relates to a headlight assembly comprising a housing having a base with one or more magnets for removably securing to a working appliance, such as a lawnmower.

Lawn care and other outdoor tasks associated with grooming and maintaining property are commonly performed using various tools and/or machines that are configured for the performance of corresponding specific tasks. For example, walk behind lawn mowers and other walk behind yard maintenance devices are popular with many users due to their relative small size and cost.

Several attempts have been made to provide headlight devices that assist with the illumination and lighting of areas in close proximity to the headlights. Headlights for such lawn equipment can be found in a variety of sizes, shapes, and dimensions. However, these conventional headlights face serious deficiencies when installing and repairing because they require screws or other more permanent fasteners to secure the headlights to the lawn equipment. This can cause damage to the lawn equipment and it does not allow for subsequent adjustment and replacement. Another deficiency is that lawn equipment is often compact and lacks large areas of accessible space for receiving headlights thereon making installation and maintenance difficult.

In addition, these known aforementioned headlights, however, fail to disclose a headlight assembly comprising a housing having a base with one or more magnets for removably securing the headlight assembly to a working appliance, such as a lawnmower. Further, these attempts fail to provide a control box that is in electrical communication with the light source of the headlight assembly. Thus, it is desirable to provide a removable control box that is mountable to the working appliance.

In light of the devices disclosed in the prior art, it is submitted that the present invention substantially diverges in design elements from the prior art and consequently it is clear that there is a need in the art for an improvement to existing headlight assemblies for working appliances, such as lawnmower. In this regard the instant invention substantially fulfills these needs.

SUMMARY OF THE INVENTION

In view of the foregoing disadvantages inherent in the known types of wiping devices now present in the prior art, the present invention provides a headlight assembly wherein the same can be utilized for mounting headlights to various working vehicles and appliances to provide illumination to the surrounding area.

The present invention relates to a headlight assembly comprising a housing having a magnetic base configured to mount to lawn maintenance equipment to provide illumination in no light or low light conditions, regardless whether the lawn maintenance equipment is powered.

It is therefore an object of the present invention to provide a new and improved headlight assembly that has all of the advantages of the prior art and none of the disadvantages.

It is therefore an object of the present invention to provide a headlight assembly that magnetically mounts to a flat or irregular surface.

It is therefore an object of the present invention to provide a headlight assembly having a housing comprising a headlight that is controllable via controls mounted to a working appliance, such as a lawnmower, for easy and convenient access.

It is therefore an object of the present invention to provide a headlight assembly that is independently controllable and in electronic communication with the power source of a piece of lawn maintenance equipment.

It is another object of the present invention to provide a headlight assembly that is in electronic communication with a substantially similar headlight assembly to provide improved illumination, wherein the headlight assemblies are independently controllably.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
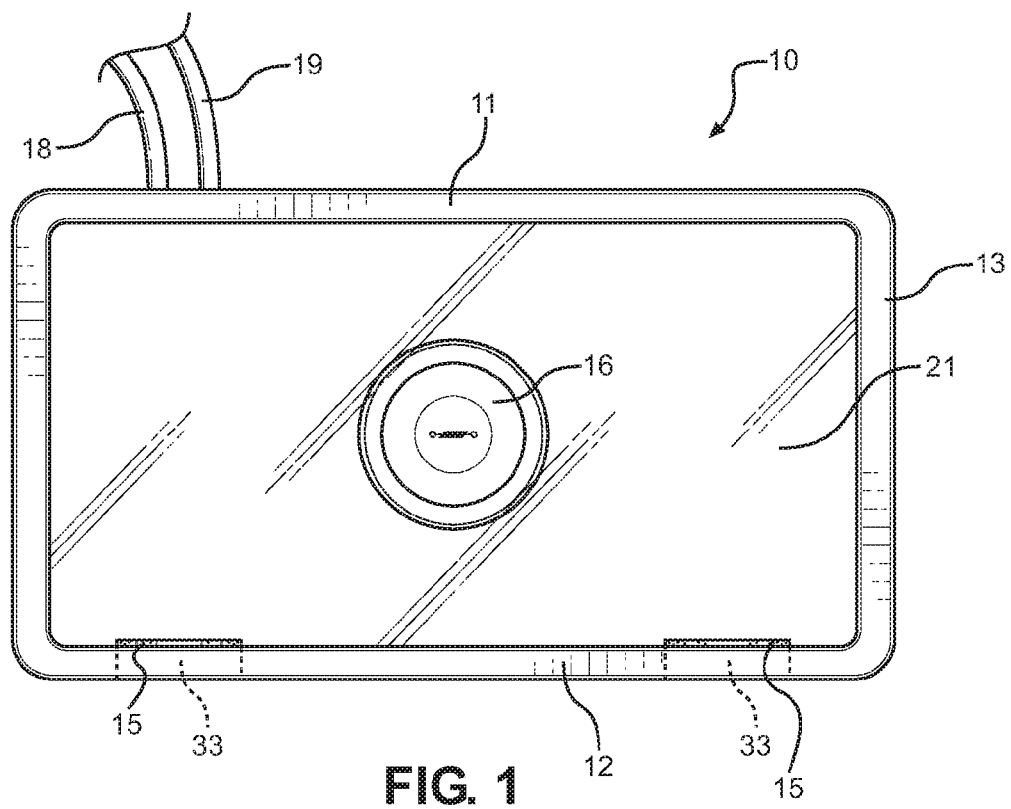
FIG. 1 shows a front perspective view of one embodiment of the present invention.

Reference is made herein to the attached drawings. Like reference numerals are used throughout the drawings to depict like or similar elements of the firearm attachment. For the purposes of presenting a brief and clear description of the present invention, the preferred embodiment will be discussed as used for helping a user to stabilize a firearm having a rail system on a flat surface. The figures are intended for representative purposes only and should not be considered to be limiting in any respect.

Referring now to FIG. 1, there is shown a front perspective view of one embodiment of the present invention. The present invention provides a headlight assembly 10 that may be magnetically coupled to a working appliance for the purpose of illuminating the surrounding area. The headlight assembly 10 comprises a housing 11 having a base 12, one or more sidewalls 13, and a cover 21 defining an interior volume. A light assembly 16 is disposed within the interior volume of the housing 11. The housing 11 further includes a first side and an opposing second side, wherein the front side includes the cover 21. In the shown embodiment, the housing 11 has a rectangular cross section, however in alternative embodiments the housing 11 may have a circular, polygonal, or other cross section.

The base 12 of the housing 11 includes a generally planar plate having one or more magnetic coupling mechanisms 15 (henceforth "magnets") configured to removably affix the housing 11 to a metallic or magnetic surface. The magnets 15 may be embedded within the base 12 or otherwise affixed thereto. In the shown embodiment, the magnets 15 are disposed within corresponding recessed areas 33 in the base 12 having a shape configured to receive the magnets 15. In this way, the magnets 15 allow the housing 11 to magnetically couple the headlight assembly 10 to a generally flat or irregular surface. This includes any surface of a working appliance such as a lawnmower, tractor, all-terrain vehicle, leaf blower, trimmer, and the like.

Figure 2:
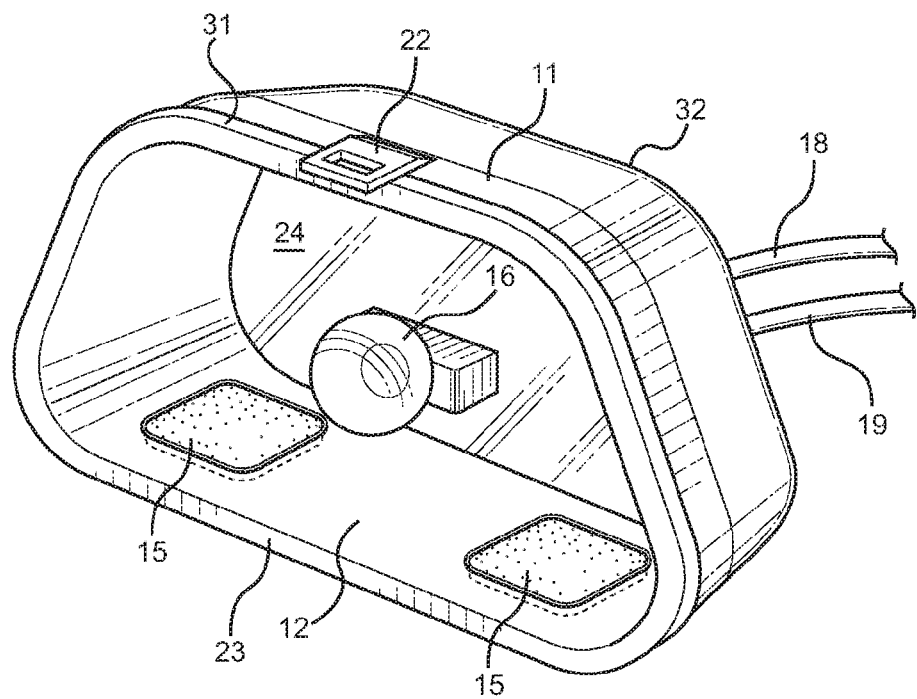
FIG. 2 shows a perspective view of one embodiment of the present invention.

Referring now to FIG. 2, a perspective view of one embodiment of the present invention is shown. In the shown embodiment, the housing 11 of the present invention includes a latch 22 configured to engage with a lip 23 for removably affixing the cover (not shown) to the first side 31 of the housing 11. The light assembly 16 is disposed within the interior volume of the housing 11. In the shown embodiment, the light assembly 16 extends from one of the sidewalls disposed on the second side 32 of the housing 11 into the interior volume towards the first side 31 and cover of the housing 11. In addition, the light assembly 16 is generally equidistant from the adjacent sidewalls 13. However in alternative embodiments, the light assembly 16 may extend for the other sidewalls 13 or the base 12. The light assembly 16 may include one or more light sources, such as an incandescent light bulb, LED light, and the like. In one embodiment, the cover is transparent and configured to allow light to pass therethrough. Thus, the light from the light assembly 16 is generally unobstructed by the cover and provides illumination to the surrounding area. The second side 32 of the housing 11 includes one or more electrical wires 18, 19 that electrically connect the light assembly 16 to at least a control box, an electrical power source, or other substantially similar headlight assembly.

The interior volume of the housing 11 further includes a reflective member 24 positioned in close proximity to and adjacent to the light assembly 16. The reflective member 24 is positioned within the housing 11 to increase and direct the light from the light assembly 16 towards the front of the housing 11. In the shown embodiment, the reflective member 24 is constructed from a mirror-like material.

In the shown embodiment, the housing 11 has a trapezoidal cross section, and the magnets 15 are fastened to the base 12 of the housing 11 via adhesives. However, in alternative embodiments the magnets 15 may be fastened to the housing 11 via any suitable fasteners, such as screw fasteners. The magnets 15 attached to the base are positioned on opposing sides of the light assembly 16 to provide stability and support during operation thereof. In use, the magnets 15 cause the headlight assembly to magnetically couple to a working appliance, such as a lawnmower, at a selected position that provide illumination in the area generally in front of the light assembly 16.

Figure 3:
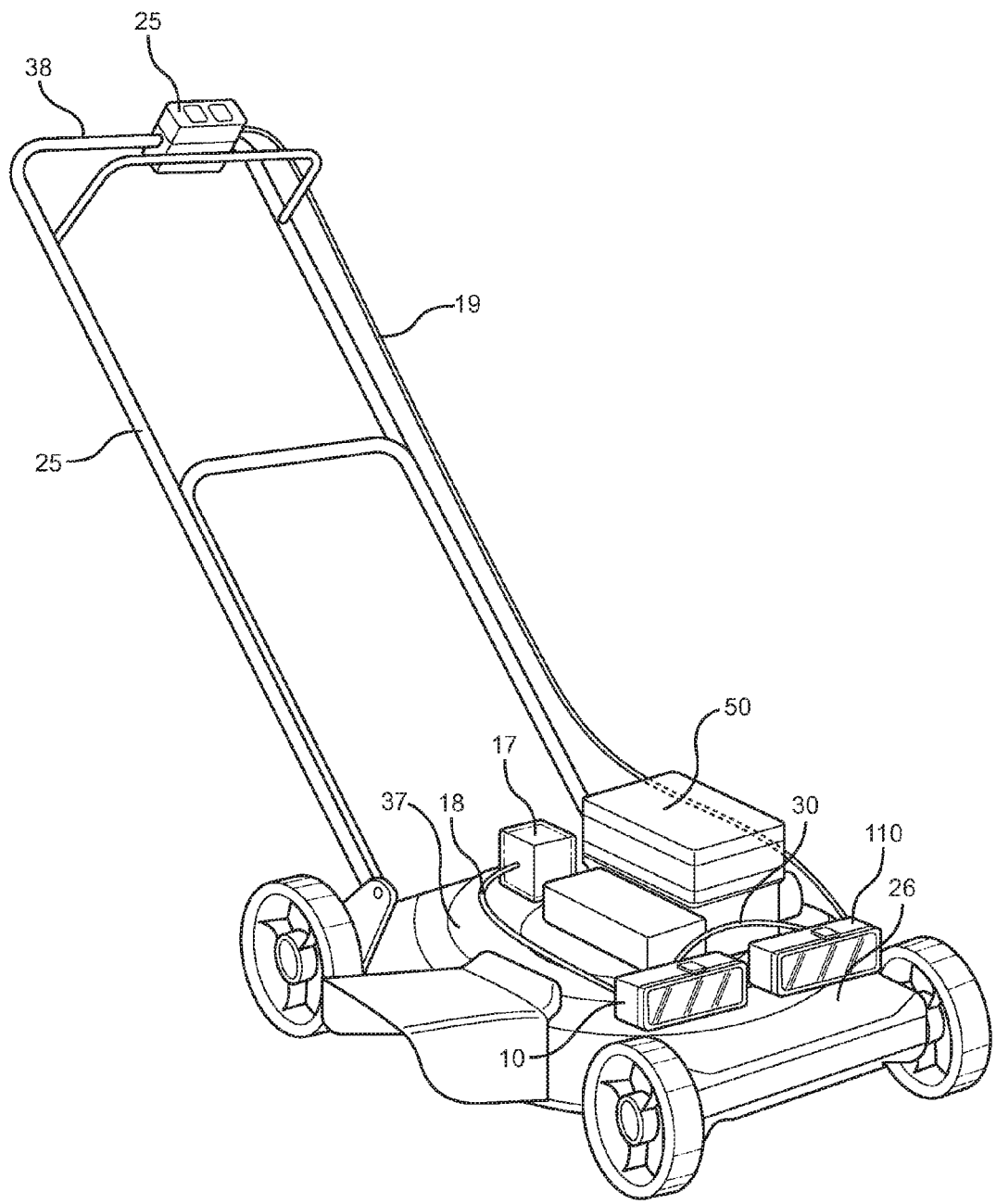
FIG. 3 shows a front perspective view of one embodiment of the present invention affixed to a lawnmower.

Referring now to FIG. 3, there is shown a front perspective view of one embodiment of the present invention affixed to a working appliance. In the shown embodiment, a pair of substantially similar headlight assemblies 10, 110 are removably affixed to a working appliance, such as a lawnmower 50. The magnets of the headlight assemblies 10, 110 magnetically couple the headlight assemblies 10, 110 to the front portion of a lower assembly 26 of the lawnmower 50, wherein the lower assembly 26 includes a deck 37 configured to receive the headlight assemblies 10, 110. In this way, light from the present invention illuminates the area generally in front of the lawnmower 50, assisting a user with the movement thereof. The headlight assemblies 10, 110 are in electronic communication with a power source 17, such as a battery. In one embodiment, the power source 17 provides electrical power to the lawnmower 50 and the headlight assemblies 10, 110. In an alternative embodiment, the power source 17 provides electrical power independently of the lawnmower 50 power source. Thus, the headlight assemblies 11, 110 may be activated even when the working appliance is not powered.

In the shown embodiment, the headlight assembly 10 is electronically coupled to a power cord 18 and to a connector cable 30, wherein the connector cable 30 joins the headlight assemblies 10, 110 and provides for joint control thereof. A control cable 19 extends from the headlight assembly 110 and is in electrical communication with a control box 25. The control box 25 is disposed on the upper assembly 27 of the lawnmower 50, however in alternative embodiments, the control box 25 may be selectively positioned as desired. In a preferred embodiment, the control box 25 comprises fasteners configured to removably attach the control box 25 to a tubular member, such as a handle 38 of a lawnmower 50. In this way, selective operation and control of the light assembly of the headlight assemblies 10, 110 can be remotely effected by a user pushing the lawnmower 50 from the upper assembly 27. In an alternative embodiment, the control box 25 includes a wireless transceiver configured for wireless communication with the headlight assemblies 10, 110. In this way, the control box 25 remotely controls the headlight assemblies 10, 110.

Figure 4:
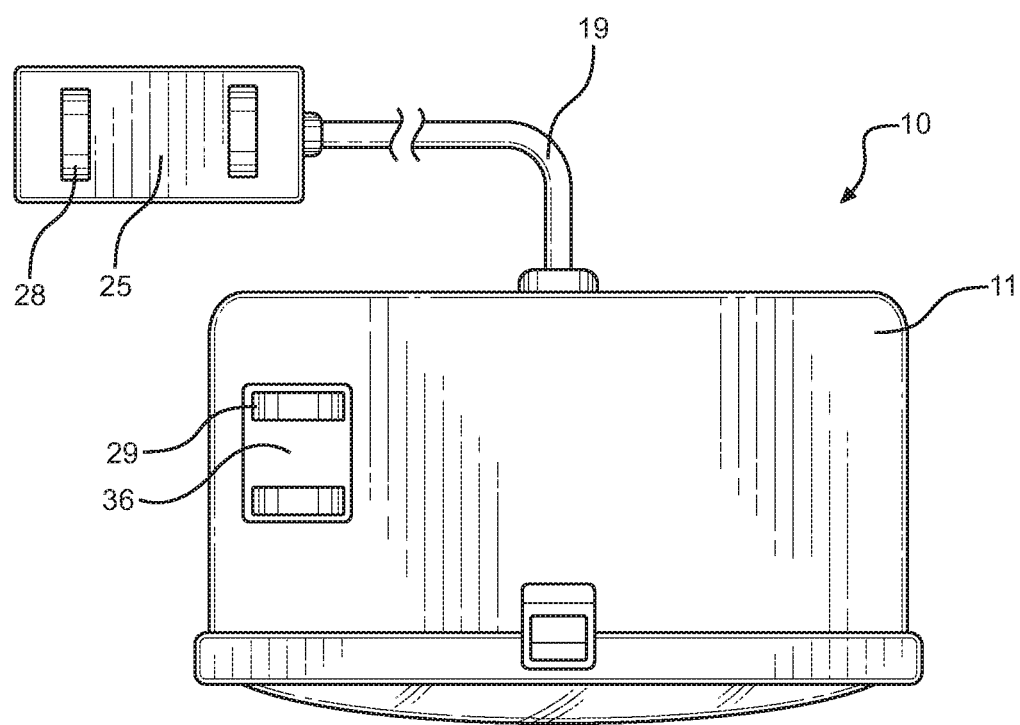
FIG. 4 shows an overhead view of one embodiment of the present invention electrically connected to a control box.

Referring now to FIG. 4, there is an overhead view of one embodiment of the present invention electrically connected to a control box. The control box 25 further comprises an interface 28 having one or more actuatable buttons configured to communicate outputs for selectively controlling the headlight assembly 10, such as controlling the settings and features of the light assembly such as activation, deactivation, dimming, and the like. The interface 28 enables a user to control the headlight assembly 10 by selectively actuating the one or more buttons. In an alternative embodiment, the housing 11 of the headlight assembly 10 includes a secondary control box 36 comprising an interface 29 having one or more actuatable buttons for controlling the settings and features of the headlight assembly 10, such as activation, deactivation, dimming, and the like. In the shown embodiment, the secondary control box 36 is disposed atop the housing 11 for convenient actuation thereof. Further, the secondary control box 36 provides for independent control of two or more headlight assemblies 10, wherein the two or more headlight assemblies 10 are in electronic communication.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A headlight assembly comprising:
a housing having a base, one or more sidewalls, and a cover defining an interior volume;
wherein said housing comprises a light assembly including one or more light sources for illuminating the surrounding area;
wherein said housing comprises one or more magnetic coupling mechanisms configured to mount said housing to a working appliance;
the base comprising a pair of recessed areas corresponding to that of the magnetic coupling mechanisms and each configured to receive one of the magnetic coupling mechanisms;
wherein each of the recessed areas are accessible from the interior volume.

2. The headlight assembly of claim 1, wherein:
said housing includes a first side and a second side;
wherein said light assembly extends from said first side of said housing towards said second side of said housing.

3. The headlight assembly of claim 1, further comprising:
a control box having an interface configured to communicate outputs for selectively controlling the light assembly.

4. The headlight assembly of claim 3, wherein:
said interface includes one or more actuatable members for controlling said light assembly.

5. The headlight assembly of claim 1, wherein:
said magnetic coupling mechanisms are adhesively affixed to said base.

6. The headlight assembly of claim 1, wherein:
said cover is a transparent shield.

7. The headlight assembly of claim 1, further comprising:
a reflective member disposed within the housing and configured to direct light from said light assembly towards said cover of the housing.

8. The headlight assembly of claim 1, wherein:
said light assembly is in electrical communication with a power source configured to provide electrical energy to at least one of said light sources.

9. The headlight assembly of claim 8, wherein:
said power source is a battery integral of said working appliance.

10. The headlight assembly of claim 9, wherein:
said power source is a battery independent of said working appliance.

11. The headlight assembly of claim 1, wherein:
said working appliance is a lawnmower having a lower assembly and an upper assembly;
wherein said lower assembly comprises a deck configured to removably receive said housing;
wherein said upper assembly comprises a handle.

12. The headlight assembly of claim 11, wherein:
a control box is removably securable to said handle via a fastener.

13. The headlight assembly of claim 1, further comprises:
a first control box and a second control box each having an interface;
the first control box including a body configured to removably secure to a handle of a working appliance;
a secondary control box disposed on an exterior of the housing of the headlight assembly;
each interface configured to communicate outputs for selectively controlling the light assembly;
each interface includes one or more actuatable members for controlling said light assembly.

14. The headlight assembly of claim 1, wherein:
the reflective member is disposed along an interior surface of the housing, exterior the light assembly.

* * * * *